INVENTORS.
ALBERT BLAIN
HERBERT F. WELSH
LOUIS D. WILSON
FRANK REED
BY George V. Eltgroth
J. L. Stirling
ATTORNEYS INVENTORS.
ALBERT BLAIN
HERBERT F. WELSH
LOUIS D. WILSON
FRANK REED
BY
BY George V. Eltgroth
J. L. Sterling
ATTORNEYS

TAPE UNIT

Filed June 29, 1953

INVENTORS.
ALBERT BLAIN
HERBERT F. WELSH
LOUIS D. WILSON
FRANK REED
BY George V. Eltgroth
J. L. Sterling
ATTORNEYS INVENTORS
ALBERT BLAIN
HERBERT F. WELSH
LOUIS D. WILSON.
FRANK REED
BY
George V. Eltgroth
John L. Sterling
ATTORNEYS INVENTORS
ALBERT BLAIN
HERBERT F. WELSH
LOUIS D. WILSON
FRANK REED
BY George V. Eltgroth
J. L. Sterling
ATTORNEYS Nov. 24, 1959 A. BLAIN ET AL 2,914,264

TAPE UNIT

Filed June 29, 1953 8 Sheets-Sheet 6

INVENTORS
ALBERT BLAIN
HERBERT F. WELSH
LOUIS D. WILSON
FRANK REED

BY George V. Eltgroth
John L. Sterling
ATTORNEYS

INVENTORS
ALBERT BLAIN
HERBERT F. WELSH
LOUIS D. WILSON
FRANK REED
BY
George V. Eltgroth
J. L. Sterling
ATTORNEYS Nov. 24, 1959 A. BLAIN ET AL 2,914,264

TAPE UNIT

Filed June 29, 1953 8 Sheets-Sheet 8

INVENTORS
ALBERT BLAIN
HERBERT F. WELSH
LOUIS D. WILSON
FRANK REED

BY George V. Eltgroth
J. L. Sterling
ATTORNEYS 2,914,264

TAPE UNIT

Albert Blain, Herbert F. Welsh, Louis D. Wilson, and Frank Reed, Philadelphia, Pa., assignors, by mesne assignments, to Sperry Rand Corporation, New York, N.Y., a corporation of Delaware Application June 29, 1953, Serial No. 364,904

38 Claims. (Cl. 242—55.12)

This invention relates to a tape unit, and in particular to one for mounting a tape or strip of material to receive data.

In some forms of machines that operate at high speed, information or data to be fed to the machine is prepared in advance in one or more tapes so that the information carried thereby will not delay operation of the machine. The information, such for instance as data induced in a magnetic tape, must be accurate, must be controlled in its introduction to the tape, and must be correctly recorded so that the data entered, which leaves no visible evidence on the tape, can be checked for correctness, quantity, and position.

It is an object of the invention, therefore, to provide a tape unit in which the tape can be passed between supply and take-up reels; can be initially fed to a position at which recording thereon can be started; can be advanced during the recording operation with suitable spacings between blockettes of data; can be rewound on the supply reel for the purpose of erasing or when recording is completed, and from which the supply reel may be removed for replacement, all phases of the operations of which can be carried out only in the proper order and without the possibility of impairing the data entered therein or improperly spacing the same.

Another object of the invention is to provide a mounting for tape reels so that the tape can be initially advanced to record starting position only when the cover of the machine is closed and to provide a means for rewinding the tape after recording that is automatically controlled to stop the machine when rewind of the tape has been completed; other automatic control means being employed for governing certain phases of the feed of the tape.

A further object of the invention is to provide a unit in which one operation of the tape can be provided by another machine, such as a typewriter or punch employing a carriage having digit spacing and return movements.

Still further objects of the invention are to provide connecting means between the movable part or carriage of a record machine and the parts of a tape unit that are operable automatically to control the movement of the tape; to provide a unit that is compact; protects the tape from damage; is inexpensive to produce; can be adapted for use with a typewriter or card punching machine; can accommodate a maximum amount of information, and one which is fool-proof in operation and control.

Other objects and advantages of the invention will be apparent during the course of the following description.

In the accompanying drawings, forming part of this specification, and in which like numerals are employed to designate like parts throughout the same, Fig. 1 is a view in sectional elevation taken through the rear portion of a power operated typewriter and through the tape unit;

Figure 1:
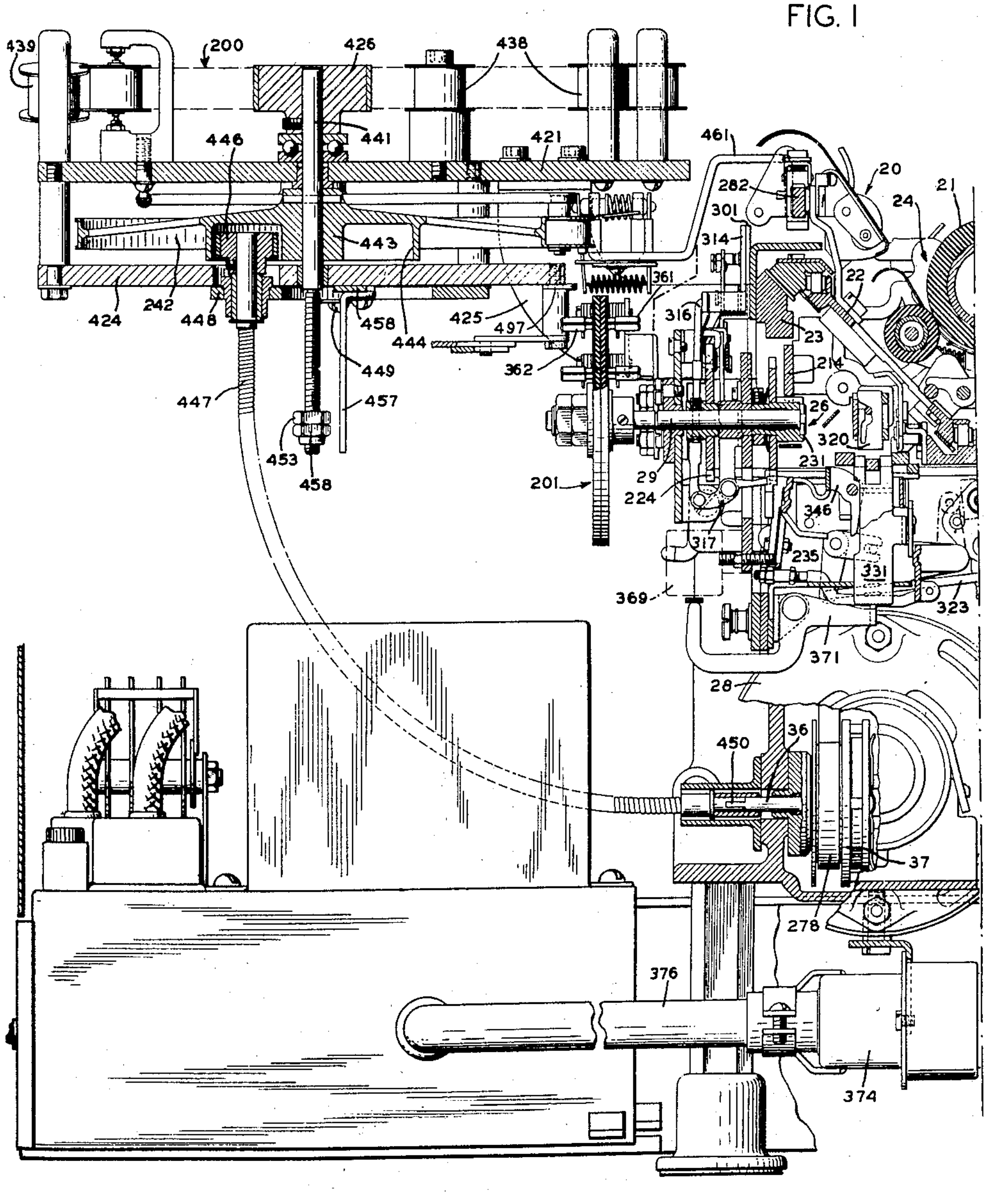

Referring to the drawing in detail, and in particular to Fig. 1, 20 indicates generally the rear portion of a business machine, such as a typewriter, which is used only as an example of a device in connection with which the present invention may be employed and which is fully shown in another application for patent Serial No. 375,359 filed August 20, 1953, now Patent No. 2,874,369, Albert Blain et al. for Machine for Recording on Magnetic Tape of which the herein described tape unit forms a part. The typewriter has the usual keyboard, not shown, from which data may be written on a work sheet held on a platen 21 mounted in a movable carriage 22 slidable in a runway 23 and constituting a platen carriage and paper feed assembly 24, the typewriter being of the power type deriving its drive from a motor 28 and a counter drive shaft 36. The operation of the keys controls the movement of the carriage through an escapement assembly 26, whose shaft 29 carries a disk switch 201 for making and breaking a circuit that may include for instance an encoding unit operated by the keys of the machine or a decoding unit for actuating the keys of a typewriter and a data head for recording data on the tape or picking up data therefrom as used in a tape unit, the latter of which is denoted generally by the numeral 200.

The movements of the carriage 22 are controlled by engagement of a feed rack 214 with a ratchet pinion 231 on shaft 29 which also carries a detent wheel 224. Suitable margin stops on a margin rack 282 determine the length of a line of typing in the usual manner, the carriage engaging the levers 301 and 314 for control of the escapement through a pull rod 315 and a detent lever 317. The carriage is controlled in tabulating action by the tabulator set stops 320 which are set to engage the carriage stop 331 which is actuated from a tabulator key through a rod 323 in proper timed relation with an escapement release bail 346 and a dog rocker 235. Operation of the tabulator will control a circuit through a switch 369 and a switch lever 371. The circuits to the recording head which latter is used only by way of example are controlled by operation of the make and break disk switch 201 and its contact arms 361 and 362 as explained in the application for patent above referred to. The carriage 22 is returned by a belt 278 operated from the shaft 36 by a clutch 37.

The data that is typed to provide a visible record is enclosed and, through the recording head, is entered on a magnetic record tape carried by the tape unit 200 or the data on a tape is picked-up by the data head 205 and may be used to control the operation of a visible record machine. This tape on a supply reel is placed in the unit and has its free end detachably secured to one end of a lead strip or tape whose opposite end is fixed to a storage reel. The cover of the unit must be closed before a pull on a handle causes a drive roller to operate a capstan and feed the lead strip to the storage reel until the record tape is in register with the recording head in what is designated as a "loading" operation. The drive roller is then moved automatically to a "neutral" position and typewriter operation, through movement of a capstan driving belt, connected to the carriage 22 by an adjustable clamp, controls the feed of the tape in recording and erasing operations. After the recording is completed the handle is pulled and the drive roller operates the capstan to run the tape back off the storage reel onto the supply reel in an operation designated as "rewind." The termination of this operation is automatically detected and after the parts are moved to a "neutral" position the cover can be opened for replacement of the reel of recorded tape. The wiring for the various operating circuits is encased in a cable 376 having a plug connection 374 to the typewriter.

The tape unit (Figs. 1, 3, 4 and 7) indicated generally by numeral 200 consists of a top plate 421 from which depends a left side plate 422, a center wall 423, a subpanel 424 and side brackets 425, the latter supporting the unit from the fixed carriage runway 23 of a typewriter used for example. The top plate 421 supports the recording or data head 205, a capstan 426 and a reel holding mandrel 427. In the operation of the unit, a supply reel 428 of data tape 429, upon which data is to be recorded or from which it is to be picked-up, is detachably mounted on the mandrel 427 and the free end of the tape is attached, by a spring clip 431 (Fig. 19) to one end of a lead strip or feed tape 432. The clip is substantially C-shaped and its closed side is pivotally held in a sleeve 432A formed in the free end of the lead strip 432. The arms of the clip are flexible so that the ends thereof can be snapped into and pivotally held in the ends of a sleeve 429A formed in the leading end of the tape 429 so that the joint can pass around the spools of small diameter. The lead strip 432 has its opposite end secured in any suitable manner to a spring urged storage or take-up reel 433 mounted on the under side of the plate 421 in coaxial relation to the mandrel 427.

The lead strip 432 is looped about the pulleys 434 and 436 of a tension compensating device 437 forming spaced, reversely positioned, bights and over various guide pulleys 438, across the erasing head 255 and the recording or data head 205 in succession, and about the major portion of the cork-faced periphery of the capstan 426 and again through the compensating device to pass over spools 439 canted to direct passage of the strip to the storage reel 433 beneath the plate 421. The capstan 426 is fixed to the upper end of a spindle 441 journalled in the top plate and subpanel and carrying between the latter two a lightweight pulley wheel 442 about the periphery of which extends an endless belt 459, passing over spring tensioned pulleys 445 and driven as later explained. The hub portion of the pulley wheel 442 is fixed to the spindle and is shaped to provide concentric inner and outer walls 443 and 444 respectively. These walls are spaced radially from each other to permit movement therebetween of a friction drive roller 446 secured to the upper end of a flexible shaft 447 carried in the free end of an arcuate arm 448 pivoted at 449 to the underside of the subpanel 424.

Figures 5, 6:
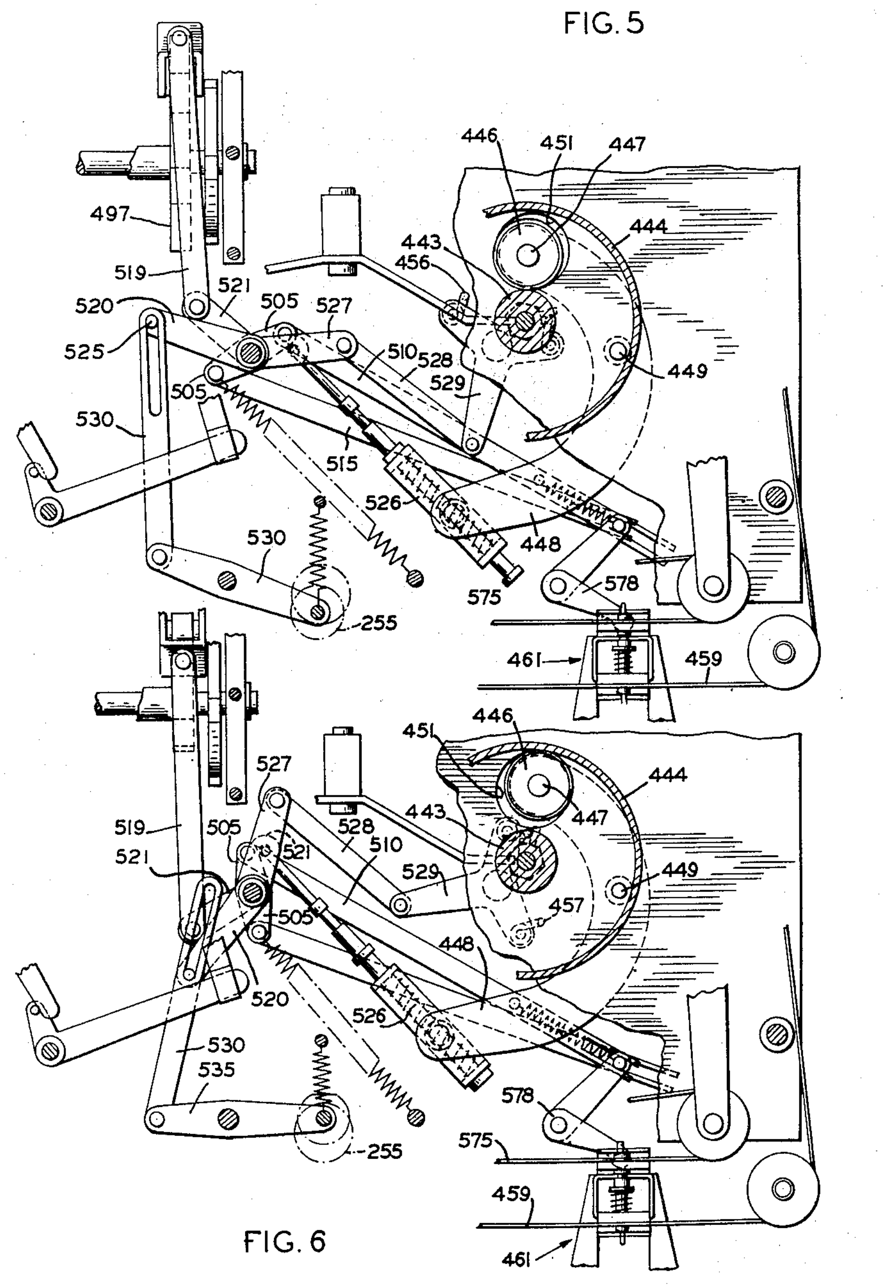
Figs. 5 and 6 are fragmentary views of the mechanism of Fig. 4 shown in the positions assumed for the tape rewinding and tape loading operations, respectively.

The shaft 447 is detachably connected as at 450 to the end of the counter drive shaft 36. The subpanel has an opening 451 so that the roller can be swung, by movements of the arm 448, from a neutral or non-operating position as shown in Fig. 1 to driving engagement with either wall 444 or 443 to provide respectively slow loading, Fig. 6, and fast rewinding operations, Fig. 5, of the capstan 426 through the pulley 442. The lower end of the spindle 441 is threaded as at 452, Fig. 7, so that a nut 453, having a laterally extending projection 454, can ride up or down on the threaded portion of the spindle as either of two diametrically opposed tappet rods 456, 457 are moved into the path of said projection, for the purpose of controlling the extent of the "loading" operation of the capstan.

In order to initially position the tape 429 for entry of data thereon or pick-up of data therefrom, the tape is drawn off the supply reel 428 by the lead strip or tape 432 until it is in engagement with the recording or data head 205. This is done by operation of the capstan when the roller 446 engages the wall 444 of the pulley 442. The extent of movement of the nut 453; which can be adjusted by the position of a lock nut 458 on the spindle, after the projection 454 is engaged by the rod 456; is in proportion to the amount of movement of the lead strip necessary to bring the leading end of the data tape 429 across the recording head 205. This operation is referred to as "loading" which is done, as is "rewinding," by operation of the capstan 426 thru the roller 446 in contradistinction to "feeding," which is accomplished through operation of the capstan by the pulley 442 driven by the belt 459 which participates in certain movements of the machine carriage 24 through an adjustable clamp 461, mentioned hereafter.

When the new reel of tape is placed on the mandrel, and the data tape has been attached to the lead strip by the clip 431, a cover 462 suitably hinged to the rear edge of the plate 421 must be closed before "loading" operation takes place in order that certain parts may be conditioned for operation. The left side plate 422 and the center wall 423 support a shaft 463 (Figs. 7 and 10) on which interconnected sleeves 464 and 465 are mounted for free turning movement, the sleeve 464 having an integral handle 466 and the sleeve 465 having an actuator arm 467 bearing a projection or stud 468. The arm 467, aligned with the handle, is limited in its forward and rearward throws against pins 469 and 470 respectively (Fig. 8), carried by the side plate.

Figures 7, 10, 11:
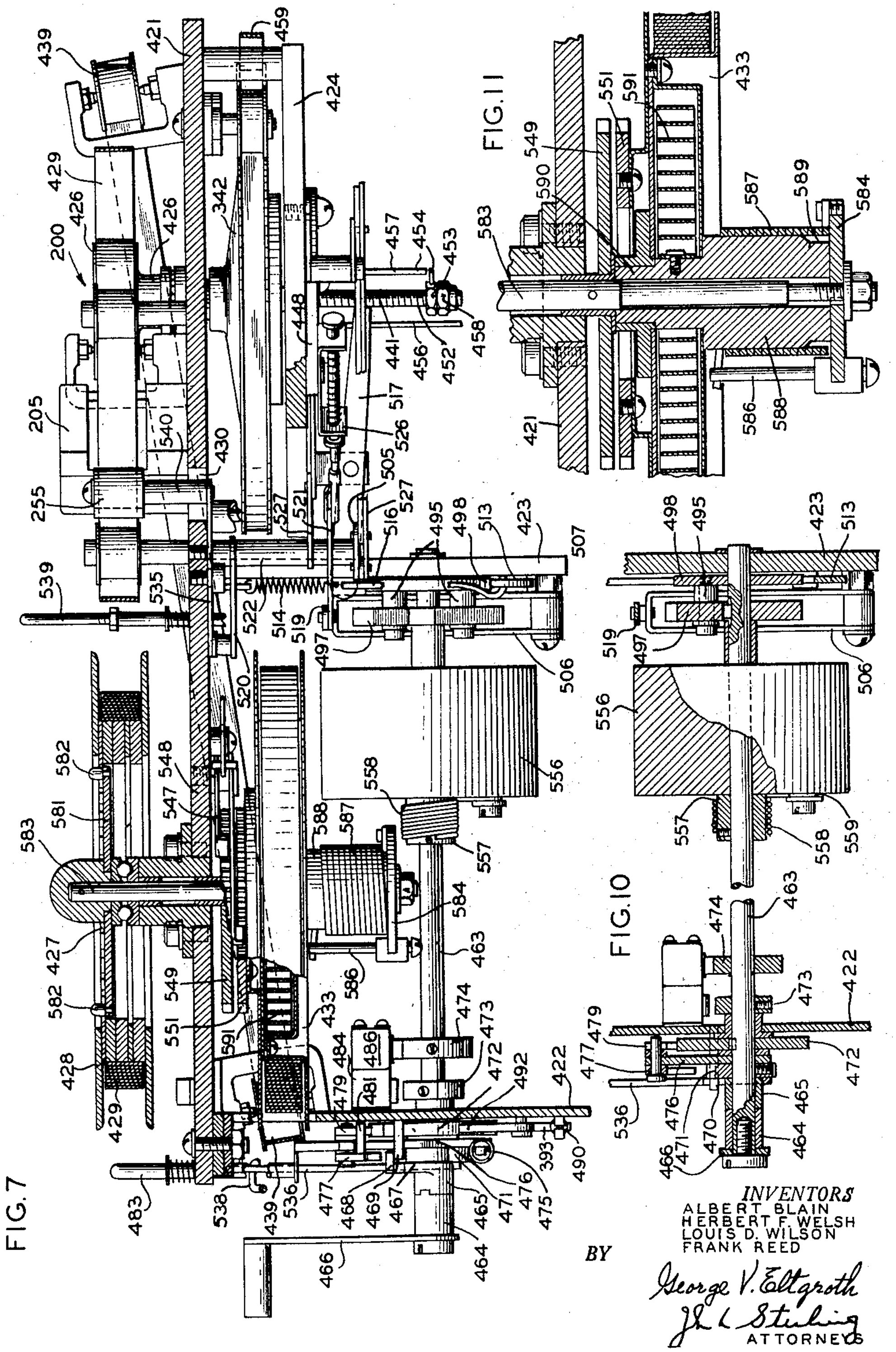
Fig. 7 is a section taken on the line 7—7 of Fig. 3.
Fig. 10 is a section on the line 10—10 of Fig. 4 showing the control mechanism of Figs. 8 and 9 in vertical section.
Fig. 11 is an enlarged sectional view of the reel mounting and control portions of Fig. 7.

Rightward from the handle in Fig. 7, the shaft has fixed thereto a cover latch cam 471, a shaft operating detent disk 472 and two switch cams 473, 474 the latter for the operation respectively of an erase circuit switch 484 and a line lock circuit switch 486. Between the disk 472 and the latch cam 471 the shaft carries loosely an actuator lever 476 on the upper end of which is mounted a detent trip arm 477 pivoted for teeter action on a pin 478 and on which arm a dog 479 is loosely carried. At its lower end the lever 476 is connected by a spring 475 with the plate 422. The trip arm 477, at its forward end, carries a laterally extending pin or projection 481 which is engaged by the leaf spring strip 482 of a cover plunger 483, yieldably mounted in the top plate. The trip 477 is shaped at its rear end to provide ledge and shoulder portions 488 and 489 respectively. To allow operation of the parts when the cover is closed the strip 482 yieldably holds the trip in the balanced position shown in Fig. 8 against a projection 491 on lever 476 so that, when the handle is swung to the rear, the stud 468 on lever 467 will ride over the ledge portion 488 against the light yielding resistance of the spring strip 482 and be latched in the shoulder notch 489.

Figures 8, 9, 12:
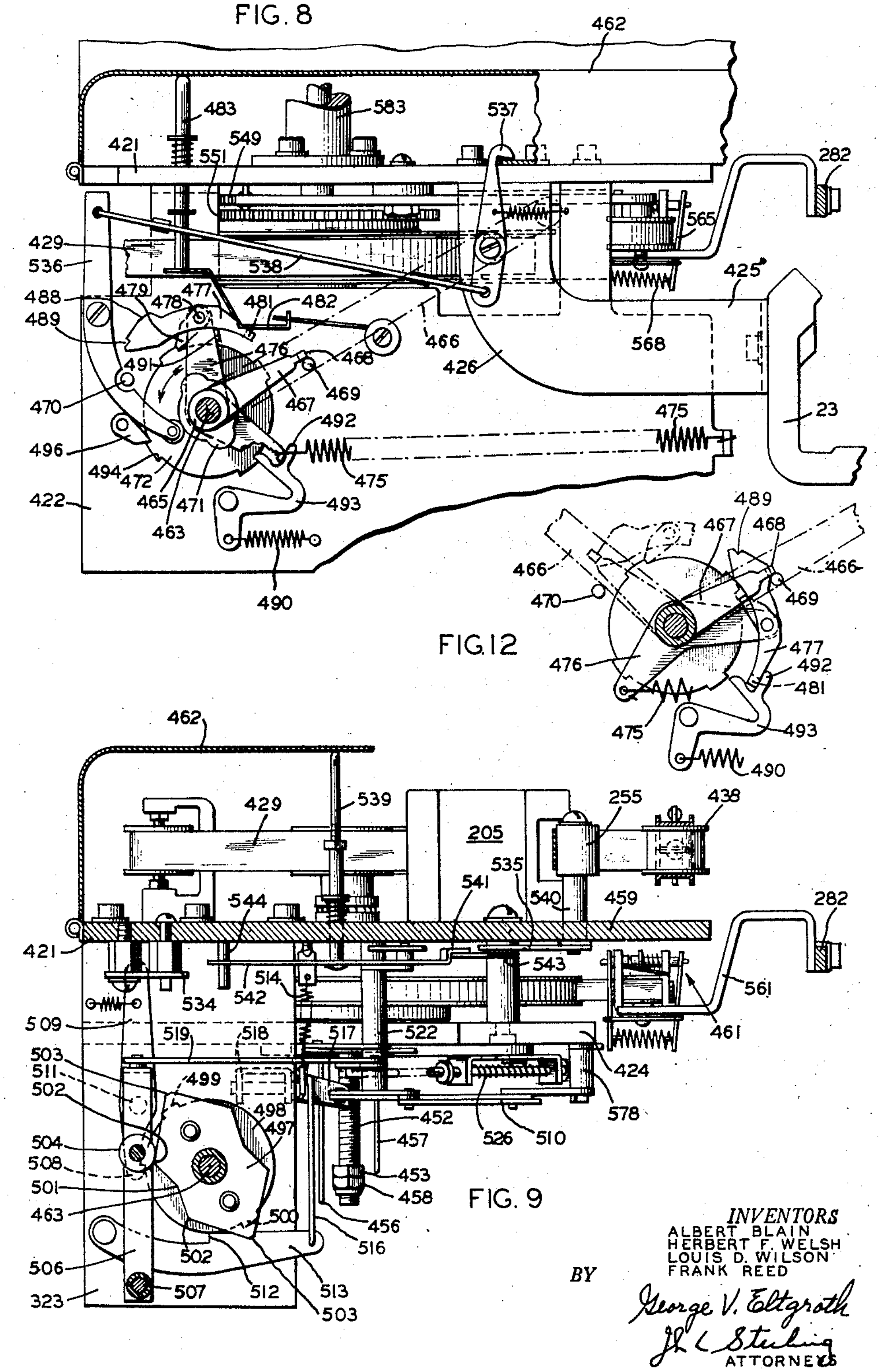
Fig. 8 is a view in elevation of control mechanism seen at the left end of Fig. 4.
Fig. 9 is a section taken on the line 9—9 of Fig. 3 showing control mechanism associated with the mechanism of Fig. 8.
Fig. 12 is a schematic view of the handle actuated trip means showing the parts in the positions they assume in a tripping action.
Figure 15:
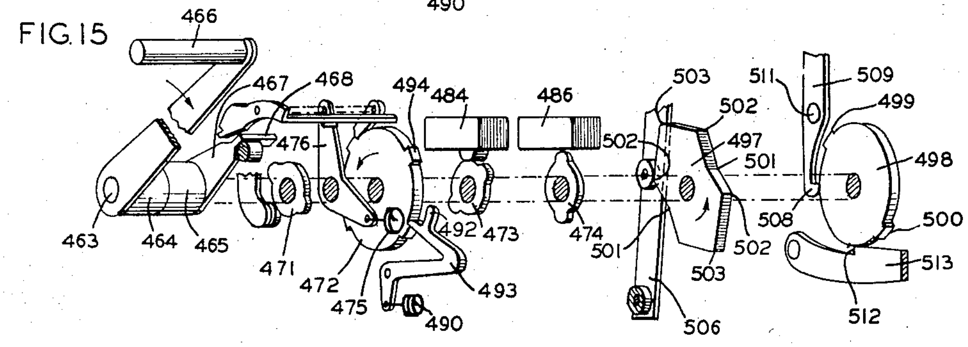

The position of the parts shown in Figs. 8, 9 and 15 is during typing and recording and when this is completed rewind of the tape from the lower storage or take-up reel 433 to the upper or supply reel 428 is in order. The handle is then pulled forward or in the direction of the arrow, Fig. 15, and the stud 468 which has engaged the shoulder 489 causes the actuator 476 to move clockwise, through push of the trip arm 477 and against the resistance of the spring 475 to position the pin 481 of the trip 477 inside a lobe 492 on a trigger detent 493. The latter, pivoted to the plate 422, is urged by spring 490 into contact with the edge of the detent disk 472 to engage any one of four teeth 494 peripherally spaced on said disk. As the pin 481 positions adjacent the lobe 492 the dog 479 rides over and engages the next clockwise tooth of the detent disk 472. When ledge 488 cams the trip 477 in counterclockwise movement by contact with pin 469 to cause the pin 481 to kick the detent 493 out of holding engagement with a tooth on the disk, the dog 479 under influence of the spring urged actuator lever 476 will turn the detent disk 472 in counterclockwise direction until the self-restoring trigger detent 493 is engaged by the next succeeding tooth 494. Movement of the disk 472 in clockwise direction is prevented by a spring urged dog 496 mounted on the plate 422.

The shaft 463, adjacent the center wall 423, has secured thereto as at 495 a control cam 497 connected to a control detent disk 498 having diametrically opposite teeth 499 and 500. The cam 497 has diametrically opposite, similar, operating dwells 501, 502 and 503, of different radial distances from the center of the shaft, to provide respectively for "loading," "neutral" and "rewinding" control of the unit through a cam roller 504 carried in a vertical rocker yoke 506 pivoted to the center wall as at 507. In the position of the parts shown in Figs. 8, 9 and 15, the cam roller is on a "neutral" dwell 502 of the cam 497. The latter is moved counterclockwise with each corresponding movement of the detent disk 472 through shaft 463. The periphery of the control detent disk 498 is engaged by the hook end 508 of a spring urged rewind detent lever 509 pivoted at 511 to the center wall, and by the notch 512 of a loading detent lever 513. The latter is held against the periphery of the cam by a spring 514 and is connected by a rod 516 to a lever arm 517 which in turn is pivoted in a bracket 518 and has its free end positioned for operation by the nut 453 at the upper limit of the latter's travel. When the operating detent disk 472 (Fig. 16) moves counterclockwise as above explained, the tooth 499 of the control detent disk 498 is caught by the hook 508 of detent lever 509 and stops a "rewind" dwell 503 of the cam 497 under the roller 504 after the latter has rocked the yoke 506.

The yoke is connected through a strap 519 with one of the extensions 521 (Fig. 4) of a digitate sleeve 522 rotatably mounted on a post 523 depending from the underside of the top plate. When the cam 497 moves initially, as above described, the sleeve 522 will turn clockwise and through aligned extension 505 will push clamp bar 510 to cause a bell crank 578 to release the clamp 461 and also through said extension 521 will push on the spring link 526 to swing the arcuate arm 448 so that the drive roller 446 will engage the inner wall 443 of the capstan operating pulley and the tape will be rewound from the storage reel 433 to the supply reel 428. Through an extension 520, having pin-in-a-slot connection 525 with a link 530, an erase head lever 535 is moved to swing the erase head 255 out of contact with the tape prior to rewind action. The erase head (Figs. 4 and 7) is mounted on a post 540, fixed on the free end of the lever 535 and extending through a limit hole 430 in the top plate 421. Through another extension 527 of the sleeve a link 528 will also swing a pivoted T-lever 529 whose aligned arms carry the tappet rods 456 and 457 to bring the short rod 457 into the path of the projection 454 on the nut 453 so that the latter will be returned to its lowermost position on the spindle from the high position it occupied as a result of the preceding "load" operation.

Figure 13:
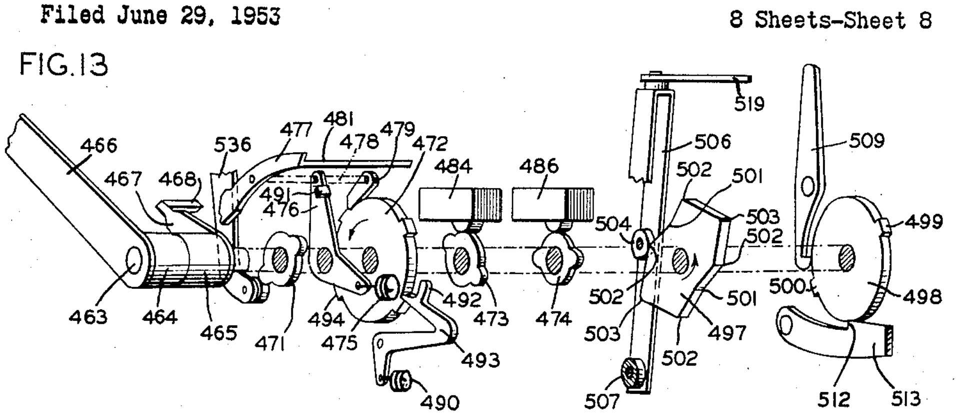
Figs. 13, 14, 15 and 16 are schematic views of the trip operated shaft showing the positions of the parts in exploded relation in the successive operations of cover open, load, record and rewind, respectively.

The storage or take-up reel 433 is provided with an arcuately disposed spring strip 531 secured to the inner wall thereof so that a pin 532 on the free end of said strip will be swung outwardly in a slot 533 in the side of the reel, when the lead strip 432 is nearly unwound, to engage and move a bell crank lever 534. The latter will rock the rewind detent lever 509 to free the detent disk 498 which will turn until the next tooth of disk 472 is arrested by the trigger detent 493 (Fig. 13). This movement will bring the "neutral" high 502 of the control cam, that is between the "rewind" and "loading" highs, beneath the roller 504 and the drive roller 446 will be returned to its non-driving or neutral position through operation of the parts connecting it to the yoke 506. At this time the cover latch cam 471 will swing a cover latch arm 536 to release the cover, by withdrawal of a spring closed latch 537, through the tie rod 538. The upward pressure of the plunger 483 and a spring raised pin 539, Figs. 8 and 9, will partly raise the cover automatically when the latch 537 is operated by its cam. This occurs only when a "neutral" dwell of the cam 497 following a "rewind" in clockwise order (Fig. 13) is positioned beneath the cam roller 504 due to the relatively located high points on cam 471. When the cover is fully opened, the tape can be detached from the leader by manipulation of the clip 431 and a new supply reel can be placed on the mandrel after the rewound one has been lifted off.

Two complete operations for loading and rewinding with alternate neutral periods are accomplished in one complete rotation of the shaft 463 and its control cam 497 and the cover latch cam 471 is provided with two high dwells corresponding to each neutral position after rewind. The neutral position, between loading and rewind, defines the period during which the tape is operated through the clamp 461 by the movements of the typewriter or other machine carriage. The cams 473 and 474 which operate respectively a recording head erase circuit switch 484 and a line lock circuit switch 486 have, like the cover cam 471, two high dwells each.

As the cover opens, the pin 539 will lift the offset end 541 of a reed detent 542 (Figs. 4 and 9) fixed to the lower end of said pin and guided by a stud 544, to free the long arm of a pawl bell crank 543 and let spring urged upper and lower pawls 547 and 548 respectively engage the teeth of upper and lower reel locking disks 549 and 551 respectively. The bell crank 543 was previously pushed over the flexible end of the reed detent 542 to snap into the offset flexible end thereof so that a pin 546 carried in the short arm of the bell crank could maintain said upper and lower pawls out of engagement with the upper and lower reel locking disks. As will be later explained, the disks are free of the pawls at all times that the cover is closed. The pawls are moved into engagement with the disks by springs 552 when the long arm of the bell crank 543 is against the pin 525 of an extension 520 on the sleeve 522, as shown in outline in Fig. 4.

Figure 14:
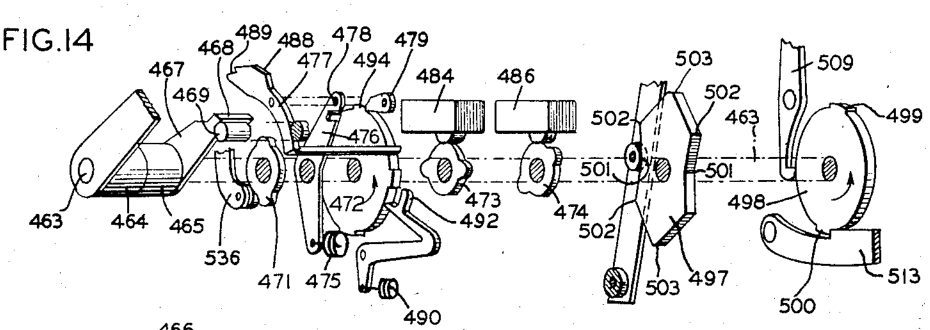

When the new supply reel has been placed on the mandrel; the tape connected to the lead strip 432 and the cover closed; the handle on a forward pull moves the actuator lever 476 and by operation of the cam 497 causes the cam roller to move into a depression 501 of the cam, said depression defining a "loading" dwell, Fig. 14. This movement of yoke 506, through the strap 519, rotates the ment of yoke 506, through the strap 519, rotates the sleeve 522 counterclockwise (Fig. 4) to cause an extension 505 to push on clamp bar 515 to cause the bell crank 578 to release the clamp 461 and through the spring link 526 engage the drive roller 446 with the wall 444 of the pulley 442 so that the lead strip 432 will pull the tape 429 to its starting position in contact with the recording head 205. This action of the sleeve through extension 520 causes the pin 525 to move the bell crank 543 clockwise until it latches over the end of the reed detent 542 which has been forced down by the pin 539 as the cover closes. The upper and lower pawls are thus moved out of engagement with their respective locking disks by the pin 546. Rotation of the sleeve 522 also causes the T lever 529 to move clockwise so that the long rod 456 is placed in the path of the projection 454 on the riding nut 453 to cause the latter to travel up the spindle 452. When the nut reaches the limit of its upward travel it rocks the lever arm 517 to cause the loading detent lever 513 to free the detent disk 498 (Fig. 14) to bring a "neutral" dwell of cam 497 under the cam roller 504 (Fig. 15) and, through operation of the yoke, restore the drive roller 446 to non-operating position. The amount of upward movement of the nut 453 is proportional to the length of the lead strip and the leading end of the tape will be brought automatically to recording position with respect to the head 265.

Figure 16:
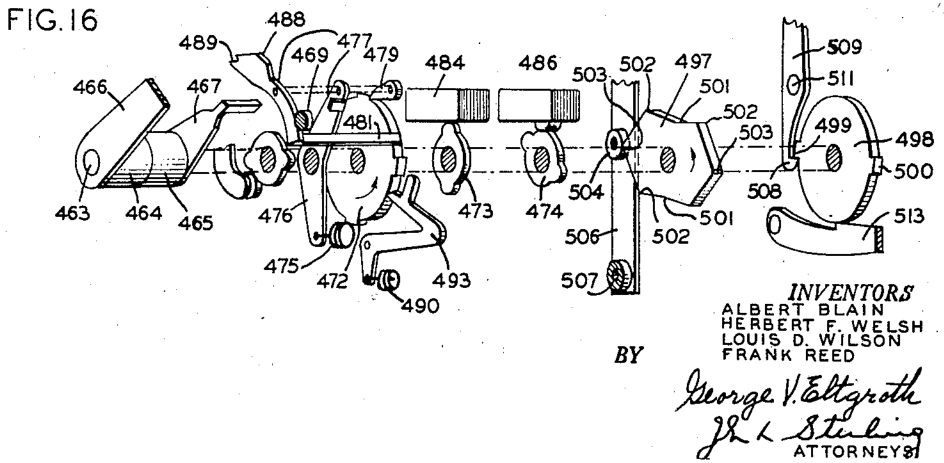

From the Fig. 13 position of the parts which is the "neutral" after "rewind" and the cam 471 has unlatched the cover, the handle is pulled forward after the tape 429 of the new reel has been clipped to the lead tape 432 and the cover is latched shut. This is the load stroke of the handle and when the trigger 493 has been kicked, the spring 475 will rotate the load control detent disk 498 until it is arrested by the loading detent lever 513. As will be seen in Fig. 14, the dog 479 is applying turning pressure to the detent disk 472 through spring 475. When the loading operation has been completed, the operation of lever 513 from the riding nut 453 will release the disk 498 and the dog 479 will rotate detent disk 472 until it is arrested by the trigger 493 as in the Fig. 15 position of the parts. This is a neutral position during which typing and recording take place. When the latter has been completed a pull on the handle will cause the dog 479 to rotate the detent disk 498 until it is arrested by the rewind detent lever 509 (Fig. 16). When rewind is complete, the pin 532 in the storage reel will move radially to release the lever 509 by operation of the bell crank lever 534 and the dog will turn the detent disk 472 until the latter is arrested by the trigger and the parts appear as shown in Fig. 13.

The shaft 463 is given a very quick counterclockwise turn as a result of the impetus given the actuator lever 476 by the spring 475 upon release of the trigger 493. In order that overthrow of the parts will be prevented, a torque cushioning weight 556 (Fig. 10) is mounted for free rotation on the shaft 463 abutting a sleeve 557 fixed to the shaft and about which sleeve a coil spring 558 is wound. The latter has one end connected to the weight as at 559 and frictionally engages sleeve 557 so that the quickly applied force of the rotary thrust of the shaft will partly be absorbed by the inertia of the weight and an even turning force will be applied to the cams and other operated parts.

Figures 2, 17, 18, 19:
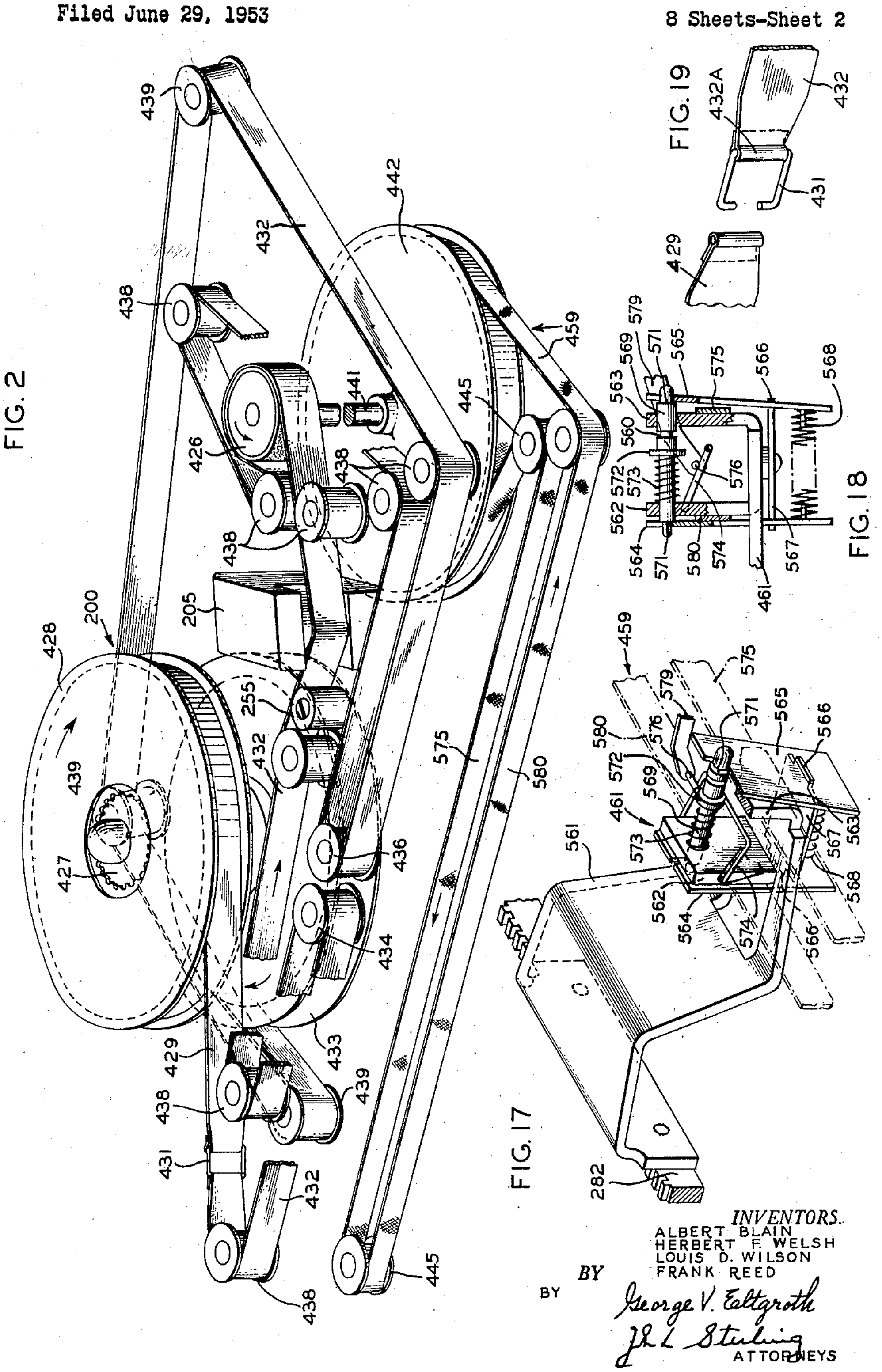
Fig. 2 is a diagrammatic view in perspective of the unit showing the tape feeding belt, the lead strip and the tape preparatory to feed of the latter past a recording head.
Fig. 17 is an enlarged view in perspective of a clamp used to connect the operating belt of the unit to the movable carriage of a machine.
Fig. 18 is a view of the clamp in vertical section.
Fig. 19 is a view in perspective of the clip used for connecting the end of the lead strip and the data tape.
Figure 3:
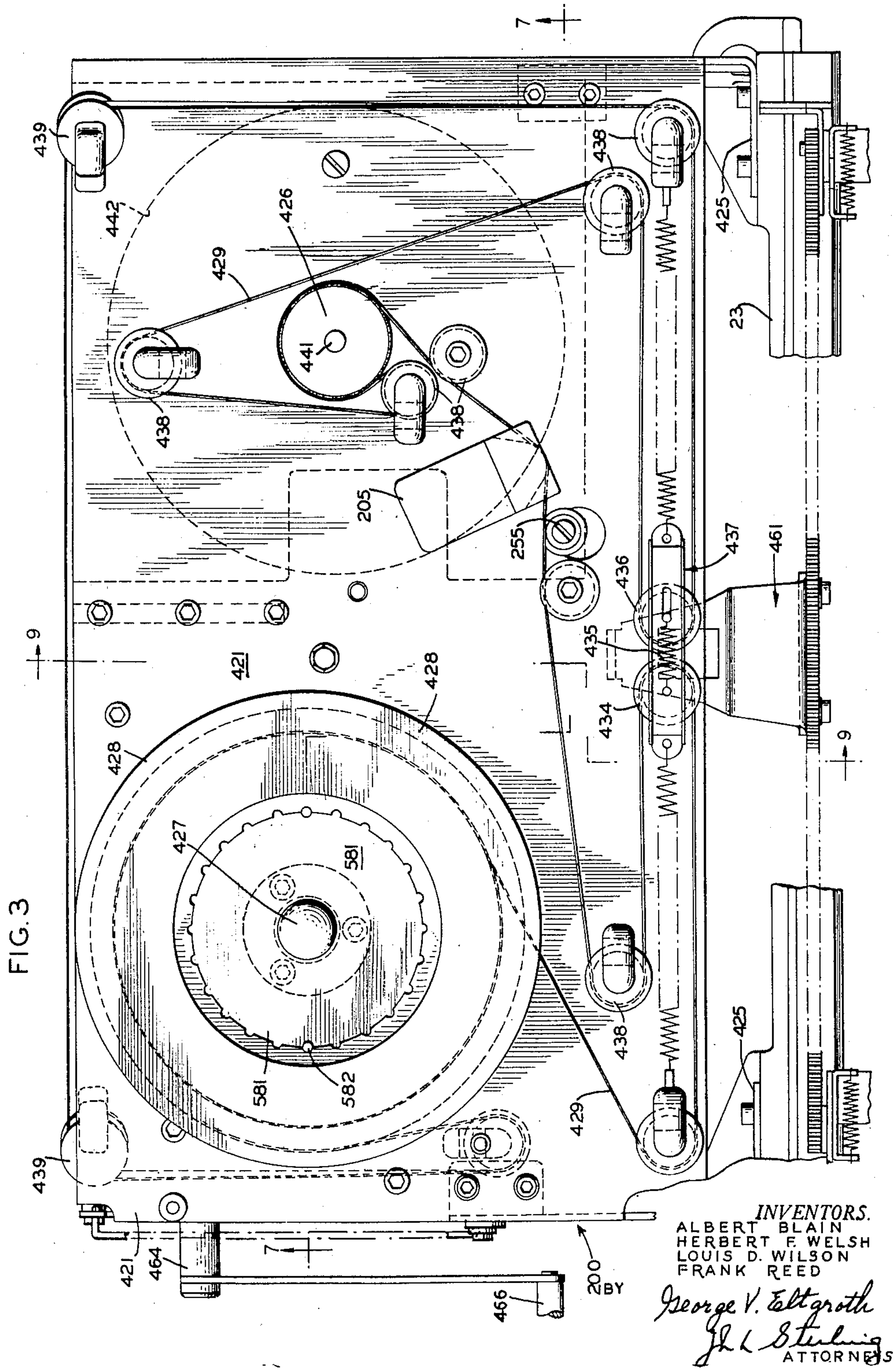
Fig. 3 is a plan view of the tape unit showing a tension compensating device and means for mounting the unit on a machine part.

In addition to the power operation of the tape unit, from the drive shaft 36 of a typewriter, movement of the carriage 22 may also control the movement of the data tape 429 through the drive belt engaging clamp 461. The latter (Figs. 1, 4, 17 and 18) is made up of a bracket 561 suitably secured to the back of the margin stop rack 282 and shaped to provide vertical fixed jaw portions 562 and 563 which coact, respectively, with clamp plates 564 and 565 which are pivotally secured at their lower ends to tabs 566 formed at the opposite ends of a pivot plate 567 secured to the underside of the bracket. A compression spring 568 between the lower extremities of the clamp plates urges them toward the jaw portions to grip the drive belt 459, in accordance with the action of a control plunger 569. The latter has reduced guide ends, which pass through slots in the upper ends of the plates and provide shoulders 571 for abutting relation with said plates, and an annular collar 572 between which and the jaw portion 562 a coil spring 573 is positioned. A spring raised bail 574 is pivoted in the jaw 562 so that when the plunger is pushed, against the resistance of the spring 573, the bail engages a peripheral groove 560 to latch the plunger 569 in restrained or cocked position. Referring to Fig. 18, the bail 574 has been shown after it has been released from plunger restraining position by the action of a release pin 576 carried on the armature extension 579 of a tape drive reversing electromagnet 577 which is in a circuit controlled by a trip key of the typewriter keyboard which is actuated for carriage return.

The release of the plunger 569 (Fig. 18) causes a shoulder 571 thereof to push the clamp plate 565 open or away from the jaw 563 to free the grip of the clamp on the inner reach 575 of the belt 459 or the one nearest the operator, and to cause the clamp plate 564 to grip the outer reach 580 of the belt. Prior to this action the clamp has moved said inner reach of the belt 459 leftward during typing and the tape 429 has moved rightward a distance of one blockette or a space proportional to one hundred and twenty characters of typed matter. When the clamp moves rightward in carriage return operation (Fig. 4) the belt causes the tape to be moved rightward without recording action thereon, a distance less than the space of one blockette. During this rightward movement of the clamp the protruding end of the plunger 569 engages the cupped end of a camming lever 570, pivoted to the underside of the top plate 421, to swing the lever against the resistance of its spring until the plunger is pushed back or retracted far enough to let the bail 574 engage the peripheral groove 560 after which the end of the plunger slides off the end of the self restoring lever 570. This action of the plunger opens the clamp plate 564 and allows the compression spring 568 to close the plate 565 to grip the outer reach 580 of the belt with the result that the balance of the carriage returning movement will cause the tape 429 to move in the leftward direction or opposite to its normal or recording feed direction and hence provide a space between blockettes of recorded information that is slightly less than the length of the blockette.

Figure 4:
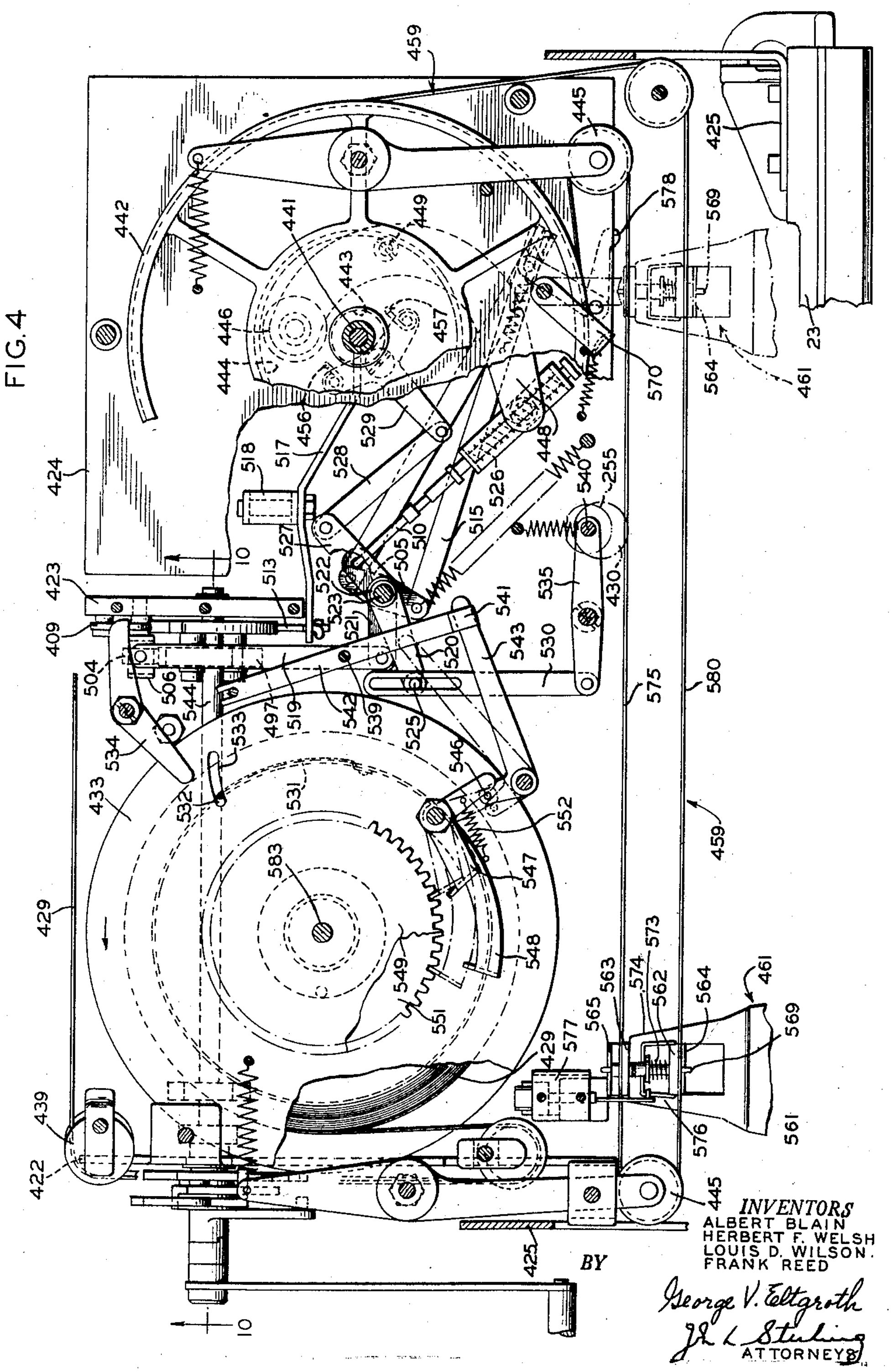
Fig. 4 is a plan view of the unit taken below the top plate thereof and having some parts broken away to show the operating mechanism.

The end of the carriage return movement of the clamp, rightward in Fig. 4, will bring the median line of the clamp into register with a clamp release sleeved bell crank 578 which is actuated, as above explained, under control of the cam 497 to push on the inner clamp plate 565 near its lower end (Fig. 1) to free the inner reach of the belt, thus keeping the clamp entirely clear of the belt so that the latter can operate freely as the pulley is driven by the drive roller 446 during the rewind and load operations.

The size of the tape unit is materially reduced by mounting the supply and storage reels above and below the plate 421 in coaxial relation. As seen in Figs. 2, 4 and 7, the mandrel 427 includes a disk 581 having peripheral pins 582 for detachable engagement by the serrated ring portion of the supply reel 428. The disk is connected to an axle or shaft 583, to the lower end of the latter of which is secured a clutch disk 584 having fixed thereto an upstanding pin 586 and the lower end of a spiral clutch spring 587 preferably of square cross section. The spring frictionally grips the cylindrical surface of an Oilite sleeve 588 supported on said disk and having a shouldered lower end of reduced diameter presenting an annular trough 589 and a reduced upper end providing a hub 590 on which the reel 433 is free to rotate. The sleeve is free of the axle 583 but when the latter is turned clockwise manually a clock type coil spring 591, one end of which is secured to a reduced portion of said sleeve, is wound to provide rotary motion for the lower storage or take-up reel 433 to which the other end of the spring is attached. As previously mentioned, the spindle of the supply reel and the storage reel 581 and 433 have secured thereto respectively the upper and lower locking discs 549 and 551 engaged respectively by upper and lower pawls 547 and 548 when the cover of the unit is open. When the cover is closed, however, the pawls free the disks and the reels operate independently of each other but under the tape feeding influence of the capstan 426. Both reels rotate in clockwise direction during recording and in counterclockwise direction to rewind. The difference in the relative speeds of the reels due to the increasing and decreasing diameters of the tape wound thereon is automatically compensated for by the clock spring which drives the reel with the smaller diameter of tape thereon faster than the reel with the larger diameter of tape thereon.

During the loading and recording or pick-up operations, the spring 591 applies clockwise force to the take-up or storage reel 433 and through the clutch and axle 583 applies counterclockwise force to the supply reel. This yieldable resistance to the feed of the tape off the supply reel, by the capstan, is counteracted by a yield of the compensating device 437, the pulley 434 of which tensions the spring 435. While the supply reel 428 is more than half full of tape its rotation is slower than that of the storage or take-up reel 433 whose spring urged operation keeps the tape between the reel 433 and the compensating device taut. As the supply becomes more than half empty it revolves faster than the take-up reel and winds up the spring 591 faster than it unwinds itself to rotate the reel 433. In order that the spring will not become overwound, the slip clutch operates. When the resistance of the spring 591 reaches a predetermined amount the resistance of the sleeve 588 to turning will cause the disk 584 to rotate the spring 587 and because the upper coils thereof grip the sleeve, the lower coils will be pulled into the trough 589 and will permit the disk to revolve enough to bring the pin 586 on said disk into engagement with the free extending end 590 of the spring 587 so that the axle and disk can continue to rotate without further winding the spring 591. This action will let the spring 591 rotate the sleeve in counterclockwise direction until the over-wound tension is relieved and at the same time the lower end of the spring 587 will unwind out of the trough to rotate the disk 584 counterclockwise to space the end of the spring from the pin and let the spring assume its gripping relation with the sleeve. The reverse rotation of the axle which is small is taken up by the compensating device 437.

On rewind, that is when the tape is fed from the take-up reel back onto the supply reel by the capstan, after recording has been completed, the pull on the tape will wind the spring 591 and the latter in its unwinding effort will, through the sleeve 588 and axle 583, rotate the wheel 428 counterclockwise to wind the tape thereon. The operation of reel 428 will be faster than operation of reel 433 and the spring provides sufficient tension to keep the tape taut between the capstan and the reel 428 upon which the tape is being rewound. As the reel 433 gets more than half empty, the spring 591 will be wound up more rapidly than its unwinding force is operating the reel 428 with the result that the slip clutch will operate to prevent overwind of the spring as above explained. In as much as the supply reel 428 may be turned by hand and since any operation which gives the supply reel greater angular velocity than the take-up reel has, the clutch acts as a safety device for preventing overwind of the spring, and the tensions occasioned by the variations in the changes of angular velocities imparted to the reels is balanced by the automatic operation of the tension compensating device 437.

While this invention has been described and illustrated with reference to a specific embodiment, it is to be understood that the invention is capable of various modifications and applications, without departing essentially from the spirit thereof, which will become apparent to those skilled in the art. For example, a key actuated card punching machine can be used with the tape unit for perforating the data in a card or sheet, in a selected code, from which the tape can be fed, magnetized or punched without the use of decoding mechanism or the data on the tape can be picked up by a pick-up or data head for controlling the operation of a typewriter or punch through a decoding mechanism connected in circuit with said data head.

What is claimed is:

1. In a tape unit, in combination, tape holding means, tape recording means, feed means for passing the tape between said holding means and past a tape recording means including belt means presenting adjacent parallel reaches, reciprocal clamp means for engaging either of the reaches of said belt means, and means for adjusting said clamp means to grip one reach of the belt means to feed the tape in the same direction in which the clamp is moving.

2. In a tape unit, in combination, tape holding reel means, feed means for passing the tape between said reel means and past a tape data head means, said feed means including a belt presenting adjacent parallel reaches, reciprocating clamp means for engaging either of the reaches of said belt, and means for adjusting said clamp to grip one reach of the belt to feed the tape in a direction opposite to that in which the clamp is moving.

3. In a tape unit, in combination, tape supporting means, data recording and feeding means for the tape, feed means for passing the tape between said supporting means and past a tape data head including belt means presenting parallel reaches, clamp means for engaging said belt and movable in alternate directions, means for adjusting said clamp means to grip one reach of the belt to feed the tape in the same direction in which the clamp means is moving and another means for adjusting the clamp means to grip another reach of the belt to feed the tape in a direction opposite to that in which the clamp means is moving.

4. In a tape unit, in combination, tape holding means, data recording and feeding means for the tape, feed means for passing the tape between said holding means and past a tape data head including belt means presenting parallel reaches and a constantly driven power member for selective engagement with said feed means, clamp means for engaging said belt means and moving the latter in alternate directions, and means for disengaging the clamp for operation of said feed means by said power member.

5. In a tape unit, in combination, supply and take-up reels for a tape, feed means for passing the tape between said reels and past a tape reading and recording means including an endless belt and movable clamp means for moving said belt, means for guiding the tape in passage between said reels including pulleys about which the tape passes to form spaced, reversely positioned bights, and means for mounting said bight forming pulleys in yieldable relation to each other to provide tape tension compensating means between said feed means and said reels.

6. In a tape unit, in combination, coaxially mounted supply and take-up reels for a tape, feed means for passing the tape between said reels, means connected to one of said reels for automatically compensating for differences in speed of operation of the reels by varying diameters of tape thereon, detent means for engagement with one of said reels, a movable cover for the unit and means governed by the movements of said cover for controlling the operation of said detent means.

7. In a tape unit, in combination, supply and take-up reels for a tape, feed means for passing the tape between said reels, means connected to one of said reels for automatically compensating for relative differences in speed of operation of said reels by varying diameters of tape thereon including a shaft with which said supply reel rotates, a sleeve free on said shaft, a clutch disk fixed to said shaft, a spiral spring having a free end and surrounding said sleeve for gripping engagement with the latter and having the other end secured to said disk, a coil spring connecting said sleeve and the take-up reel and adapted to be wound by unwinding rotation of either of said reels to provide winding rotation of the other reel, and a projection on the disk engaging the free end of the spring for distending the latter to free the sleeve when the rotary speed of one reel exceeds the rotary speed of the other and winds said coil spring to a predetermined tension.

8. In a tape unit, in combination, supply and take-up reels for a tape, feed means for passing the tape between said reels, means connected to one of said reels for automatically compensating for relative differences in speed of operation of said reels by the varying diameters of tape thereon including a shaft, with which said supply reel rotates, a sleeve free on said shaft having a peripheral area of reduced diameter, a disk fixed to said shaft, a pin on said disk, a spiral spring having a free end for engagement by said pin and surrounding said sleeve for gripping engagement with the latter and having one end secured to the disk and the other free end spaced from said pin, said disk and spring constituting a releasable connection between the sleeve and the shaft, a coil spring connecting said sleeve to said take-up reel and adapted to be wound by unwinding rotation of either reel to provide winding rotation of the other reel, and said spiral spring at one end being contracted by an initial turning movement of the disk to bring the pin into contact with the free end of said spiral spring to distend the latter and free said sleeve when the rotary speed of one reel exceeds the rotary speed of the other and winds said coil spring to a predetermined tension.

9. In a tape unit, in combination, supply and take-up reels for a tape, feed means for passing the tape between said reels, means connected to one of said reels for automatically counteracting relative differences in speed of operation of said reels by varying diameters of tape thereon including a shaft with which the supply reel rotates, a sleeve on said shaft, a coil spring connecting the take-up reel and the sleeve and providing driving means for said supply reel and adapted to be wound, by unwinding rotation of either of said reels to provide winding rotation of the other reel, means coupling said sleeve and shaft and operable to release the sleeve when the rotary speed of one reel exceeds the rotary speed of the other reel to wind said coil spring to a predetermined tension, and compensating means coacting with said counteracting means for tensioning the tape in passage between said reels.

10. In a tape unit, in combination, reels for holding tape, feed means for passing the tape between said reels and past a data head means including a drive belt having parallel reaches and a constantly operated power means, clamp means for engaging either of the reaches of said belt and moving the latter in alternate directions and in step by step movement in one direction, means for disengaging the clamp for operation of the feed means by said power member, and means for controlling the operation of said power member for moving the tape in alternate directions.

11. In a tape unit, in combination, reels for holding data and lead tapes, feed means for passing both tapes between said reels and past a recording means including a capstan and power drive means for the capstan, means for detachably connecting the ends of said tapes together, control means for adjusting said power drive means to feed the tapes in opposite directions, and means for automatically disabling said control means and the feed means when one of said tapes has been fed past said recording means.

12. In a tape unit, in combination, feed means for passing a tape including power drive means, a movable cover for the unit, control means for adjusting said power drive means to feed the tape, means for actuating said control means, and means controlled by the position of said cover for conditioning said actuating means for operation.

13. In a tape unit, in combination, reels for holding tape, feed means for passing the tape between said reels including power drive means, control means for adjusting said power drive means to feed the tape in opposite directions, a movable cover for said unit, means for latching the cover in closed position, and means operated by said control means for releasing said latching means after passage of a predetermined amount of said tape in one direction.

14. In a tape unit, in combination, reels for holding tape, feed means for passing the tape between reels, including a belt and a power drive means common to said feed means, a clamp for operating said belt from a moving source, means for controlling the operation of said power drive means and means operated by said control means for disengaging the clamp from the belt during operation of said power means.

15. In a tape unit, in combination, reels for holding tape, feed means for passing the tape between reels including a belt presenting parallel reaches and a power drive means common to said feed means, a clamp for operating said belt from a moving source, means for disengaging the clamp from one reach of the belt and engaging it with the other reach of the belt, means for controlling the operation of said power drive means, and means operated by said control means for disengaging the clamp from the belt during operation of said power means.

16. In a tape unit, in combination, reels for holding tape, feed means for passing the tape between reels, including pulley means presenting radially spaced walls, a power driven roller and means for moving the roller into contact with either wall to feed the tape in opposite directions, gauge means associated with said pulley means, means for controlling the operation of said power roller, and means actuated by said gauge means for governing said controlling means in accordance with the amount of tape passed by said feed means.

17. In a tape unit, in combination, reels for holding tape, feed means for passing the tape between the reels including pulley means presenting radially spaced walls, a power driven roller and means for moving the roller into contact with either wall to feed the tape in opposite directions, a cover hinged to the unit, means for operating said roller moving means including a shaft, an actuator arm and trip means connecting the arm and the shaft for operation of the latter, and means controlled by said cover for disabling said trip means as a connecting medium when the cover is open.

18. In a tape unit, in combination, reels for holding tape, feed means for passing the tape between the reels including pulley means, indepedent means for operating said pulley means including a belt and a power driven roller, a clamp for connecting the belt to the movable carriage of a business machine, means for disconnecting said clamp from the belt, means for moving the roller into and out of operative engagement with said pulley means including a cam, rocker means operated by said cam, and linking means connecting said rocker means with said roller moving means and with said clamp disconnecting means to release the latter from the belt when the roller is moved into operative engagement with said pulley.

19. In a tape unit, in combination, reels for holding tape, means for passing the tape between reels including pulley means, alternate means for operating the pulley means including a belt and a power driven roller, a clamp for connecting the belt to the movable carriage of a business machine, means for adjusting said clamp for grip and release of the belt, means for moving the roller relatively to said pulley from a neutral position to drive the latter in opposite directions including a cam, rocker means operated by said cam, and linking means connecting said rocker means with said roller moving means and with said clamp adjusting means to release the belt when the roller moving means is shifted from said neutral position.

20. In a tape unit, in combination, reels for holding tape, feed means for passing the tape between reels, means for controlling the operation of said feed means including a shaft, a drive disk and a control disk fixed to said shaft and each having peripherally spaced projections thereon defining an amount of turning movement of said shaft, a spring biased actuator lever free on said shaft and having a pawl for engagement with a projection of said drive disk to turn the latter, trigger detent means engaging a projection of said drive disk, a trip pivoted to said actuator lever, means for yieldably holding said trip in balanced position, an actuator arm movable in one direction for overriding latching engagement with said trip and movable in reverse direction to bring said actuator lever to cocked position, means for simultaneously operating said trip to free said actuator arm and operate the trigger for single space movement of said drive disk and cam means on said shaft for governing the operation of said control means.

21. In a tape unit, in combination, clamp means for transferring the motion of a movable member to a tape operating belt presenting parallel reaches, said clamp means comprising bracket means shaped to provide fixed jaw portions, a pivoted spring urged clamp plate coacting with each jaw to grip a reach of the belt passing therebetween, spring biased means movable to hold either of said plates out of engagement with its cooperating jaw, and means for releasably latching said holding means at one position of movement.

22. In a tape unit, in combination, means for feeding the tape in either longitudinal direction past a data head including a belt presenting parallel reaches and a power driven member, clamp means for connecting either reach of the belt to a reciprocatory member, means for moving the power member between neutral and operating positions including a cam, a train of parts operated by said cam and control detent means for successively stepping said cam to operating and neutral positions, gauge means operable by said feed means for releasing said cam controlling detent means when a predetermined length of tape has been fed, and said train of parts including means for connecting and disconnecting said clamp when the power member is moved.

23. In a tape unit, in combination, means for feeding the tape in either longitudinal direction past a data head including a belt presenting parallel reaches and a power driven member, clamp means for connecting either reach of the belt to a reciprocatory member, means for moving the power member between a neutral non-operating position and two operating positions to feed the tape, and means for releasing said clamp from the belt upon movement of the power member from neutral position and for reengaging said clamp with the belt upon movement of said power member to neutral position.

24. In a tape unit, tape feeding means including a capstan, belt means for operating the capstan, a drive roller for operating the capstan and means for moving the roller to operative and inoperative positions, clamp means for connecting the belt to a movable member, and means for releasing said clamp from the belt upon movement of the roller to one of said positions and for engaging said clamp with the belt upon movement of said roller to the other position.

25. In a tape unit, in combination, means for advancing and retracting the tape past a data head including a belt having parallel reaches, clamp means for connecting either reach of the belt to a member movable in alternate directions for advancing the tape predetermined distances defining alternate space and record matter areas corresponding to a full movement of said moving member in one direction, means for adjusting said clamp to advance said tape on a movement of the member in the opposite direction and means for further adjusting said clamp during said latter movement to retract the tape.

26. In a tape unit, in combination, supply and take-up reels, means for feeding the tape between said reels including a lead strip secured to one of the reels for detachable engagement with the tape and a capstan for moving the tape past a data head, means for operating said capstan including a pulley, a drive roller and an endless belt, movable clamp means for operating said belt, feed compensating means associated with said reels, tape tension means coacting with said compensating means to automatically balance the tension of the tape between said reels and the capstan, a cover for the unit, control means for moving said drive roller from neutral to tape feeding and rewinding positions, means governed by the closing and opening movements of the cover for conditioning said control means for feed and rewind operations, means operated by the feed operation of the tape for automatically actuating said control means, means operated by the rewind operation of the tape for actuating said control means, and means operated by said control means for disengaging said clamp from the belt.

27. The tape unit as set forth in claim 26 including a spindle, a mandrel on said spindle, means for detachably mounting one of the reels on said mandrel, detent means associated with the spindle and one of said reels, and means actuated by said control means for engaging said detent means to hold said reels against rotation when said cover is open.

28. In a tape unit, in combination, feed means for passing tape past a recording means, including a belt presenting parallel reaches, clamp means for engaging said belt to move the latter in alternate directions, and means for adjusting the clamp to grip either reach of the belt to feed the tape.

29. In a tape unit, in combination, feed means for passing tape in unwind and rewind operations past a recording means, including a capstan, a driving roller for operating the capstan in alternate directions; and means including a rotary threaded spindle, a nut on the spindle having opposed arms, tappet rods for engagement by said arms to control the direction of travel of the nut on the spindle and means operated by said nut for adjusting the operation of said roller to feed the tape in oposite directions at different speeds in said unwind and rewind operations.

30. In a tape unit, in combination; coaxially mounted supply and take-up reels for a tape; feed means for passing the tape between said reels including a capstan, belt means for operating the capstan, a drive roller for operating the capstan and means for moving the roller to operative and inoperative positions; clamp means for connecting the belt to a movable member; means for releasing said clamp from the belt upon movement of the roller to operative position and for engaging the clamp with the belt upon movement of said roller to inoperative position; tension means for guiding the tape in passage between said reels, including pulleys about which the tape passes to form spaced, reversely positioned bights; means for mounting said bight forming pulleys in yieldable relation to each other to provide tape tension compensating means between said feed means and said reels; means associated with the reels for automatically compensating for relative differences in speed of operation of said reels by varying diameters of tape thereon including a shaft with which said supply reel rotates; a sleeve free on said shaft; a disk fixed to said shaft; a spiral spring for gripping the sleeve and having one end secured to said disk; a coil spring connecting said sleeve and the take-up reel and adapted to be wound by unwinding rotation of either of said reels to provide winding rotation of the other reel; a projection on the disk for distending said spiral spring to free the sleeve when the rotary speed of one reel exceeds the rotary speed of the other and winds said coil spring to a predetermined tension; detent means associated with said reels; a movable cover for the unit; and means governed by the movements of said cover for controlling the operation of said detent means.

31. In a tape unit; supply and storage reels for holding a tape; a pulley wheel and capstan unit including a constantly driven power roller for driving the capstan and a belt presenting parallel reaches for driving the wheel and capstan; a lead strip having one end secured to the storage reel and the other end detachably secured to the leading end of the tape to be fed by the capstan from the supply reel past a record unit to said storage reel; means for moving the roller from a neutral to various operating positions relatively to the capstan to provide comparatively slow and fast feed of the tape; clamp means for engaging the belt to move the latter in alternate directions; and means for automatically disengaging the clamp for operation of said capstan by said roller.

32. In a tape unit; tape supply and storage reels; a pulley wheel and capstan unit including a constantly driven power roller for driving the capstan for feeding a tape, having one end attached to the supply reel and a lead end secured to the storage reel, to and past a record unit; means for moving the roller from a neutral position to a capstan operating position; a cover for the unit; manual means for controlling the operation of said roller moving means; and means operable when the cover is closed to condition said manual means for operation.

33. A tape unit as set forth in claim 30 including pawl means for holding said reels against rotation, means, including a latch, for moving and holding the pawls out of engagement with said reels, and means operable when the cover is closed to condition the latch means for holding action.

34. In a tape unit; tape supply and storage reels; a pulley wheel and capstan unit including a constantly driven power roller for driving the capstan to feed a tape, having one end attached to the supply reel and a lead end secured to the storage reel, to and past a record unit; means for moving the roller from a neutral position to a capstan operating position; means for automatically shifting said roller to neutral position when the tape is fed from the supply reel to the record unit; manual means for controlling the operation of said roller moving means to pass the tape from the storage to the supply reel; a cover for the unit; and means operable when the cover is closed to condition said manual means for operation.

35. A tape unit as set forth in claim 32 including a latch for holding the cover closed and means for releasing said latch after the tape has been passed from the storage to the supply reel.

36. A tape unit as set forth in claim 26 in which said movable clamp means includes bracket means shaped to provide fixed jaw portions, a pivoted spring urged clamp plate coacting with each jaw to grip a reach of the belt passing therebetween, spring biased means movable to hold either of said plates out of engagement with its cooperating jaw, and means for releasably latching said movable means at one position of movement.

37. In a tape unit, in combination, as set forth in claim 11 in which said means for connecting the ends of said tapes together comprises a substantially C-shaped clip for pivotal connection at its closed side through a sleeve formed in one end of one tape and being shaped to provide flexible side portions and axially aligned offset ends on said side portions for yieldable pivotal engagement in the opposite ends of a sleeve formed in one end of the other tape to be joined.

38. In a tape unit as set forth in claim 11 in which said tape feed means includes a roller for rotating the capstan in either direction, means for adjusting said roller for operation of the capstan including a rotary threaded spindle, a nut on said spindle having opposed arms, tappet rods for engagement by said arms to control the direction of travel of the nut on the spindle and means operated by said nut for controlling the operation of said roller adjusting means.

References Cited in the file of this patent

UNITED STATES PATENTS

| | | |
|---|---|---|
| 1,006,664 | Lawhead | Oct. 24, 1911 |
| 2,504,587 | Rey | Apr. 18, 1950 |
| 2,589,660 | Bauman | Mar. 18, 1952 |
| 2,624,574 | Camras | Jan. 6, 1953 |
| 2,658,954 | Del Valle | Nov. 10, 1953 |
| 2,676,798 | Blaney | Apr. 17, 1954 |
| 2,702,834 | Golle et al. | Feb. 22, 1955 |